United States Patent
Feldtkeller

[19]

[11] Patent Number: 6,157,177
[45] Date of Patent: Dec. 5, 2000

[54] SWITCHED MODE POWER SUPPLY FOR SUPPLYING A MAIN AND AN AUXILIARY ELECTRICAL CIRCUIT

[75] Inventor: Martin Feldtkeller, München, Germany

[73] Assignee: Infineon Technologies AG, Munich, Germany

[21] Appl. No.: 09/233,278

[22] Filed: Jan. 19, 1999

[51] Int. Cl.[7] .................................................. G05F 1/577
[52] U.S. Cl. ........................ 323/267; 323/222; 323/282; 323/299
[58] Field of Search .................. 323/222, 267, 323/282, 299, 351

[56] References Cited

U.S. PATENT DOCUMENTS

| | | | |
|---|---|---|---|
| 5,532,577 | 7/1996 | Doluca | 323/282 |
| 5,677,619 | 10/1997 | Doluca | 323/282 |
| 5,691,889 | 11/1997 | Bazinet et al. | 323/222 |
| 5,977,753 | 11/1999 | Edwards et al. | 323/222 |
| 5,982,639 | 11/1999 | Balakrishnan | 323/222 |
| 5,982,642 | 11/1999 | Herfurth | 323/222 |
| 5,999,419 | 12/1999 | Marrero | 323/222 |
| 6,005,781 | 12/1999 | Balakrishnan | 323/222 |

OTHER PUBLICATIONS

"Power–Factor–Controller TDA 4815/19 verbessert Leistungsfaktor von Schaltnetzteilen", Werner Schott, Siemens Components 31, Feb. 1993, issue 2, pp. 46–50.

*Primary Examiner*—Jeffrey Sterrett
*Attorney, Agent, or Firm*—Herbert L. Lerner; Laurence A. Greenberg; Werner H. Stemer

[57] ABSTRACT

A power supply for supplying a main electrical circuit during normal operation and an auxiliary electrical circuit during standby operation, includes a switched power converter, which is connected between an input voltage and the main electrical circuit and has an inductor, a controllable switch, a first rectifying unit and a control unit for the switch. A second rectifying unit couples the voltage dropping across the inductor into the auxiliary electrical circuit. During standby operation, the control unit controls the switch in such a way that the switched power converter is operated in resonance mode.

11 Claims, 2 Drawing Sheets

SWITCHED MODE POWER SUPPLY FOR SUPPLYING A MAIN AND AN AUXILIARY ELECTRICAL CIRCUIT

BACKGROUND OF THE INVENTION

Field of the Invention

The invention relates to a power supply for supplying a main electrical circuit during normal operation and an auxiliary electrical circuit during standby operation.

Modern electronic equipment such as, for example, PC, fax or TV equipment nowadays usually has a standby function. In the case of a TV set in the standby state, the set is "switched off" and can be switched back to normal operation through the use of a remote control, for example. In the case of a fax machine, the machine is in the ready-to-receive state and is switched on by an incoming fax signal, for example. Therefore, the different equipment states of "standby operation" or "normal operation" frequently need separate requirements of the power supply. During standby operation, the current consumption ought to be as small as possible. In particular, the only equipment functions that ought to be supplied in that case are those which are necessary to ensure fast readiness for use and which are required to identify a start signal such as, for example, an infrared signal of a remote control or a received signal of a fax modem. In the case of future PC machines, which should be switched on and off through a local area network (LAN), the auxiliary power supply must additionally have a high efficiency. With a maximum efficiency for the operating states of an item of equipment being taken into account, the power supply is usually realized nowadays in such a way that a main power supply is provided for a nominal/maximal load and an additional auxiliary power supply is provided for a minimal load as is required, for example, during standby operation of a PC machine.

With regard to technological/economical considerations and in order to fulfill existing national and international standards and regulations, the main power supplies in the future will contain not only a known DC—DC converter operating on the basis of pulse width modulation for the main power supply of the item of equipment but also, in many instances, a further AC-DC converter, which is a so-called PFC converter (PFC=Power Factor Correction). The PFC converter will serve to effect the prescribed improvement in the power factor, while the traditional pulse width modulation converter will perform the transformation and supply system isolation. The power factor is defined as the ratio between absorbed active power and absorbed apparent power. The power factor is ideally equal to 1. There are no reactive volt-amperes in that case. The PFC converter is typically constructed as a step-up converter for cost reasons and due to its high efficiency. Alternatively, the PFC converter may also be constructed as a flyback converter, for example.

It would be advantageous, then, to use the PFC converter as a power supply for standby operation with the item of equipment or pulse width modulation converter switched off, and thus to obviate the need for a separate auxiliary power supply. Such power supplies of a switched mode power supply unit are specified, for example, in an article entitled "Power-Factor-Controller TDA 4815/19 verbessert Leistungs-faktor von Schaltnetzteilen" [Power Factor Controller TDA 4815/19 Improves Power Factor of Switched Mode Power Supply Units] by Werner Schott, in Siemens Components 31 (1993), issue 2, pages 46 to 50. Furthermore, power supplies of the afore-mentioned type are described, for example, in data sheets concerning the TK 84 819 module from the company Toko, the LT 1509 module from the company Linear Technology, and the ML 4824 module from the company Microlinear. However, in those cases what is disadvantageous is that the operation of the PFC converter necessitates a base load, which must be greater as the input voltage and the output current become higher. As a result, only a very unfavorable efficiency is obtained.

SUMMARY OF THE INVENTION

It is accordingly an object of the invention to provide a switched mode power supply for supplying a main electrical circuit during normal operation and an auxiliary electrical circuit during standby operation, which overcomes the hereinafore-mentioned disadvantages of the heretofore-known devices of this general type and which achieves a higher efficiency during standby operation.

With the foregoing and other objects in view there is provided, in accordance with the invention, a power supply for supplying a main electrical circuit during normal operation and an auxiliary electrical circuit during standby operation, comprising a switched or pulsed power converter connected between an input voltage and the main electrical circuit, the switched power converter having an inductor, a controllable switch, a first rectifying unit and a control unit for the switch; and a second rectifying unit for coupling a voltage dropping across the inductor into the auxiliary electrical circuit; the control unit controlling the switch during standby operation for operating the switched or pulsed power converter in resonance mode.

As a result of resonance operation, the switching losses of the pulsed power converter are minimized. This also means, however, that the overall efficiency of the power supply during standby operation is substantially increased.

In accordance with another feature of the invention, in order to obtain the resonance mode, during standby operation, the switch is switched on by the control unit only when, due to decaying transient processes of preceding switching operations, the voltage across the switch is equal to zero. When a step-up switched mode regulator PFC is used, it is necessary, moreover, for the output voltage of the step-up switched mode regulator to be at least twice as high as the input voltage of that regulator. Therefore, according to the invention, for the auxiliary power supply, the step-up switched mode regulator is operated in the resonance mode in accordance with the profile of the sinusoidal half-cycles applied at the supply system end only in time intervals in which the instantaneous value of the input voltage is less than the rated output voltage of the step-up switched mode regulator. If the input voltage is higher than half of the rated output voltage of the power converter, then the switch is not switched on.

In accordance with a further feature of the invention, there is provided a capacitor connected between the inductor and the second rectifying unit. Capacitive coupling of the second rectifying unit makes it is possible to transfer a relatively high power due to the high operating frequency in the resonance mode, with the result that burst operation becomes possible. A rectifying capacitor in the second rectifying unit stores enough energy for intermissions between the burst pulses. The burst pulses are effected most favorably at the instants at which the instantaneous value of the input voltage is approximately half as high as the DC output voltage of the power converter. In this operating mode, no power is transferred to the output of the power converter and thus to the main electrical circuit, with the result that only a minimal base load, if any, is required.

In this case, the regulation of the output voltage at the second rectifying unit can be effected by modulation of the width of the burst pulses, for example. Regulation of the supply voltage in the auxiliary electrical circuit is thus obtained with little effort.

In accordance with an added feature of the invention, the voltage across the inductor is picked off through the use of an auxiliary winding inductively coupled to the inductor. Optimum impedance matching of the auxiliary electrical circuit to the inductor is thus possible.

In accordance with an additional feature of the invention, during standby operation, the power converter is operated at a frequency which is essentially equal to the resonant frequency formed from the inductance of the inductor and the sum of all of the capacitances connected in parallel with the inductance.

The operating frequencies for normal operation and standby operation in this case can be identical or can differ from one another.

In accordance with yet another feature of the invention, the switch is not switched on during standby operation by the control unit if the input voltage is higher than half of a rated output voltage of the power converter.

In accordance with yet a further feature of the invention, the switched power converter is a step-up converter.

In accordance with yet an added feature of the invention, the switch is switched on during standby operation by the control unit in the form of a sequence of momentary pulses.

In accordance with yet an additional feature of the invention, the sequences of pulses are effected at instants at which an instantaneous value of the input voltage is essentially half as large as a voltage across the auxiliary electrical circuit.

In accordance with a concomitant feature of the invention, the control unit regulates a number of pulses within the sequence as a function of a voltage across the auxiliary electrical circuit.

Other features which are considered as characteristic for the invention are set forth in the appended claims.

Although the invention is illustrated and described herein as embodied in a switched mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
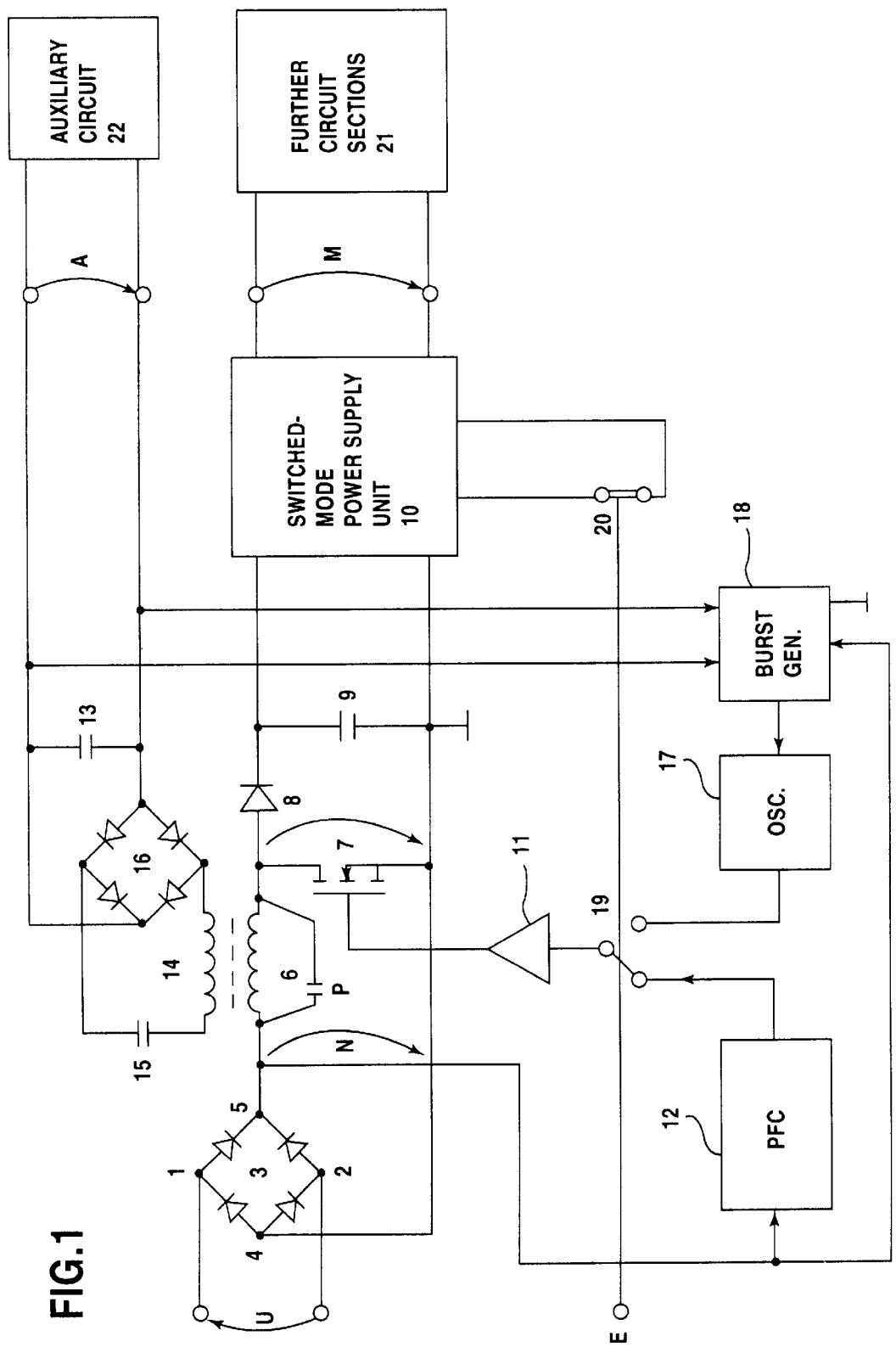
FIG. 1 is a schematic and block circuit diagram of one embodiment of a power supply according to the invention.

Referring now to the figures of the drawings in detail and first, particularly, to FIG. 1 thereof, there is seen an exemplary embodiment in which a sinusoidal supply system voltage U is applied to two input nodes 1 and 2 of a bridge rectifier 3 having output nodes 4 and 5 at which a pulsating DC voltage N can accordingly be picked off. One terminal of an inductor 6 is connected to the output node 5. Another terminal of the inductor 6 is connected to a drain terminal of an MOS field-effect transistor 7 of the n-channel type as well as to one terminal of a diode 8. A source terminal of the MOS field-effect transistor 7, which serves as a controlled switch, is connected to the output node 4 of the bridge rectifier 3. One terminal of a smoothing capacitor 9 is also connected to the output node 4 of the bridge rectifier 3. Another terminal of the smoothing capacitor 9 is coupled to another terminal of the diode 8. A voltage dropping across the smoothing capacitor 9 serves to supply a main electrical circuit, having a switched mode power supply unit 10 which is connected downstream of the smoothing capacitor 9. The switched mode power supply unit 10 has an output at which a voltage M is present for supplying further circuit sections 21 of the main electrical circuit 10, 21.

The MOS field-effect transistor 7 is driven on the gate side through the use of a driver circuit 11, which is in turn driven by a PFC control circuit 12. An input of the PFC control circuit 12 is connected to the output node 5 of the bridge rectifier 3. The PFC control circuit 12 acts, in conjunction with the inductor 6, the MOS field-effect transistor 7, the diode 8 as well as the smoothing capacitor 9, as a step-up converter in a known manner and serves as ar active harmonic filter for the switched mode power supply unit 10 connected downstream.

An auxiliary electrical circuit 22 is fed by a voltage A dropping across a smoothing capacitor 13. In this case, the voltage A is generated through the use of an auxiliary winding 14 and a bridge rectifier 16. The auxiliary winding 14 is inductively coupled to the inductor 6 and the bridge rectifier 16 is connected downstream of the auxiliary winding 14 through a coupling capacitor 15. The smoothing capacitor 13 is in turn connected downstream of the bridge rectifier 16.

During standby operation, the switch 7 is controlled through the use of an oscillator 17, which is in turn controlled by a burst generator 18. In this case, burst signals of the burst generator 18 for the control of the oscillator 17 are generated as a function of the voltage A as well as of the output voltage N at the rectifier 3. A changeover switch 19 is provided in order to change over between the two operating modes. Therefore, elements 11, 12, 17, 18, 19 form a control unit for the switch 7. Elements 6, 7, 8 and the control unit form a switched power converter connected between the input voltage and the main electrical circuit 10, 21. Through the use of the changeover switch 19 the input of the driver circuit 11 can be connected optionally to an output of the PFC control circuit 12 and an output of the oscillator 17, as a function of a control signal E. Furthermore, it is possible for the switched mode power supply unit 10 to be switched off during standby operation, through the use of a switch 20 with the control signal E.

In the case of the power supply according to the invention, switching losses are the least during standby operation because the input section is operated in the resonance mode. This is achieved, for example, by virtue of the fact that switch-on is effected only at instants at which the voltage across the switch 7 is equal to 0, due to decaying transient processes of preceding switching operations. A precondition for this, in the case of a PFC regulator such as, for example, a step-up switched mode regulator, is that the output voltage is at least twice as high as the input voltage. Therefore, according to the invention, the PFC regulator is operated as an auxiliary power supply in the resonance mode in the profile of the sinusoidal half-cycles applied at the supply system end, only in time intervals in which the instantaneous value of the input voltage is less than the DC output voltage of the PFC regulator. Furthermore, with capacitive coupling of the auxiliary winding 14 to the rectifier 16, it is possible to transfer a relatively high power at a high operating frequency in the resonance mode, with the result that only burst operation is necessary. In this case, the smoothing capacitor 13 stores enough energy for the intermissions between the burst pulses. In this case, the burst pulses are most favorably effected at the instants at which the instantaneous value of the input voltage is approximately half as high as the DC output voltage of the PFC regulator. In this case, no power is transferred to the smoothing capacitor 9 at the output of the PFC regulator, with the result that only a minimal base load, if any, is required. The output voltage of the auxiliary power supply can be regulated by modulation of the width of the burst pulses, for example. During standby operation, then, the PFC regulator operates at a frequency which is approximately equal to the resonant frequency formed from the inductance of the inductor and the relevant capacitances.

Such as, for example, stray capacitance of the inductor and junction capacitance of the switch and of the rectifier 16. In this case, the PFC regulator does not operate as a function of the instantaneous value of the supply system voltage when the latter is significantly higher than half of the rated DC output voltage of the PFC regulator. During standby operation, the oscillator 17 switches the switch 7 on when the switch voltage reaches a minimum. Furthermore, the burst generator 18 switches the oscillator 17 on and off as a function of the supply system voltage and as a function of the auxiliary output voltage A.

Figure 2A:
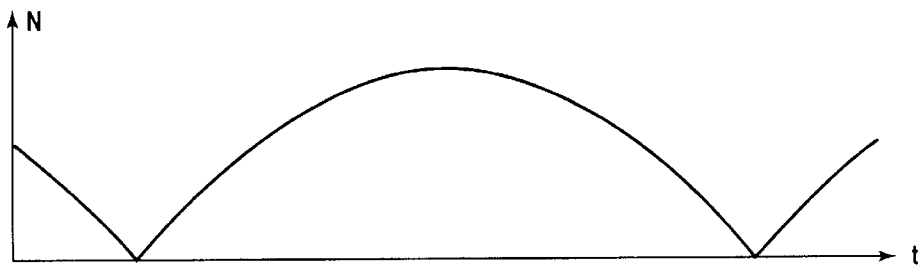
FIGS. 2a–2d are graphs showing profiles of selected signals for the power supply according to FIG. 1.
Figure 2B:
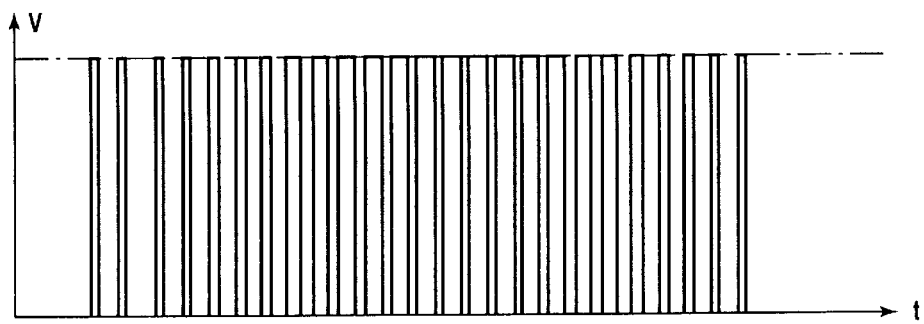
Figure 2C:
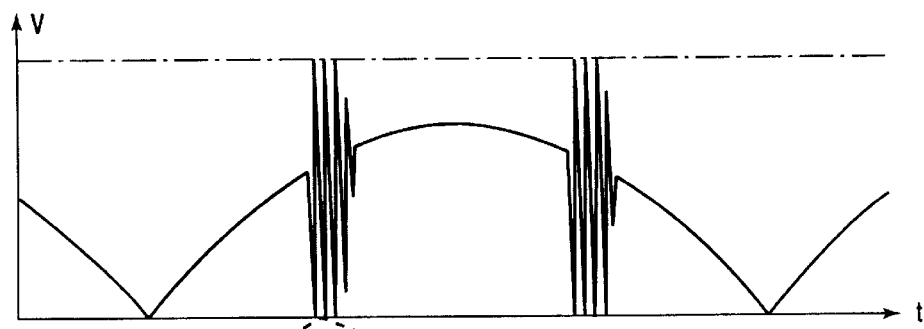
Figure 2D:
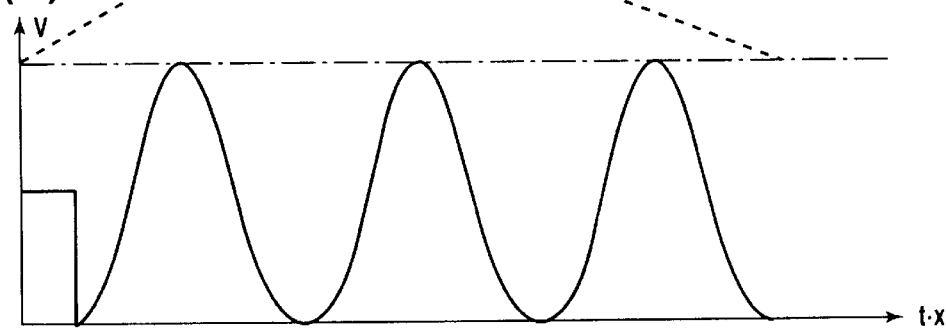

In FIG. 2a, the pulsating DC voltage N is plotted against time. The voltage N can be picked off between the output terminals 4 and 5 of the rectifier 3 and is consequently produced by rectification from the supply system voltage U. During normal operation, the switch 7 is driven from this by the PFC control circuit 12 in such a way that a pulse width-modulated square-wave signal corresponding to the pulsating DC voltage N is established across the switch 7. The profile of the voltage V across the switch 7 as a function of the time t is illustrated in FIG. 2b. Furthermore, the voltage V across the switch 7 during standby operation is shown in FIG. 2c. When specific voltage values of the voltage N are reached, for example at half of the peak value of the voltage N, burst pulses are generated through the use of the switch 7 in each case for a specific period of time. In this case, the driving is effected through the use of the oscillator 17 and the upstream burst generator 18. The burst pulses in this case are formed of a high-frequency, for example sinusoidal sequence of oscillations for the duration of the burst pulse. FIG. 2d shows the sequence of oscillations of a burst pulse temporally expanded x-fold.

I claim:

1. In a power supply for supplying a main electrical circuit during normal operation and an auxiliary electrical circuit during standby operation, the improvement comprising:

a switched power converter connected between an input voltage and the main electrical circuit, said switched power converter having an inductor, a controllable switch, a first rectifying unit and a control unit for said switch; and a second rectifying unit for coupling a voltage dropping across said inductor into the auxiliary electrical circuit;

said control unit controlling said switch during standby operation for operating said switched power converter in resonance mode.

2. The power supply according to claim 1, wherein said control unit switches said switch on during standby operation only when a voltage across said switch is approximately zero.

3. The power supply according to claim 1, including a capacitor connected in series with said inductor and said second rectifying unit.

4. The power supply according to claim 1, including an auxiliary winding inductively coupled to said inductor for picking off a voltage across said inductor.

5. The power supply according to claim 1, including capacitances connected in parallel with an inductance of said inductor, said power converter operated during standby operation at a frequency essentially equal to a resonant frequency formed from said inductance and a sum of said capacitances.

6. The power supply according to claim 1, wherein said switch is not switched on during standby operation by said control unit if the input voltage is higher than half of a rated output voltage of said power converter.

7. The power supply according to claim 1, wherein said switched power converter is a step-up converter.

8. The power supply according to claim 1, wherein said switch is switched on during standby operation by said control unit in the form of a sequence of momentary pulses.

9. The power supply according to claim 8, wherein the sequences of pulses are effected at instants at which an instantaneous value of the input voltage is essentially half as large as a voltage across the auxiliary electrical circuit.

10. The power supply according to claim 8, wherein said control unit regulates a number of pulses within the sequence as a function of a voltage across the auxiliary electrical circuit.

11. The power supply according to claim 1, including a switched mode power supply unit for supplying the main electrical circuit during normal operation and a deactivating switch for switching off said switched mode power supply unit during standby operation.

* * * * *